US010640174B2

(12) United States Patent
Li

(10) Patent No.: US 10,640,174 B2
(45) Date of Patent: May 5, 2020

(54) APPARATUS AND A METHOD FOR SOLID FUEL GASIFICATION WITH TAR SELF-REMOVED WITHIN THE GASIFIER

(71) Applicant: Dalian University of Technology, Dalian, Liaoning Province (CN)

(72) Inventor: Aimin Li, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 158 days.

(21) Appl. No.: 16/076,042

(22) PCT Filed: Apr. 19, 2017

(86) PCT No.: PCT/CN2017/080993
§ 371 (c)(1),
(2) Date: Aug. 7, 2018

(87) PCT Pub. No.: WO2018/028235
PCT Pub. Date: Feb. 15, 2018

(65) Prior Publication Data
US 2019/0153342 A1 May 23, 2019

(30) Foreign Application Priority Data

Aug. 9, 2016 (CN) .......................... 2016 1 0648708

(51) Int. Cl.
*C10J 3/84* (2006.01)
*B63B 21/26* (2006.01)

(52) U.S. Cl.
CPC ........ *B63B 21/26* (2013.01); *B63B 2021/265* (2013.01); *Y02P 20/124* (2015.11)

(58) Field of Classification Search
CPC ............ C10J 2200/09; C10J 2300/0936; C10J 2300/1838; C10J 3/08; C10J 3/16;
(Continued)

(56) References Cited

U.S. PATENT DOCUMENTS 4,394,132 A * 7/1983 Taylor ..................... C10L 1/326
241/5
5,059,404 A * 10/1991 Mansour ................. B01B 1/005
423/201

(Continued)

FOREIGN PATENT DOCUMENTS

CN   102643676 A   8/2012
CN   202543155 U   11/2012

(Continued)

*Primary Examiner* — Imran Akram
(74) *Attorney, Agent, or Firm* — Muncy, Geissler, Olds & Lowe, P.C.

(57) ABSTRACT

The present invention relates to an apparatus and a method for solid fuel gasification with tar self-removed within the gasifier, and the apparatus consists essentially of a feeder, a gasifier, a slag extractor, a cyclone separator for gasification gas fly ash or fly ash filter separator, a condenser, a condensate evaporator, a preheating device for gasification medium and a gas holder. Feed the solid fuel into the gasifier through the double sealed feeding valves from the feeding inlet, the solid fuel within the gasifier generates gasification gas, ash and slag after reaction of drying, pyrolysis, gasification and combustion. The present invention provides an apparatus and a method for solid fuel gasification with tar self-removed within the gasifier, which can not only accomplish effective removal of tar and zero discharge of coking wastewater, but also optimize gas quality during the process, improve energy efficiency and reduce operating cost.

4 Claims, 1 Drawing Sheet

(58) Field of Classification Search
CPC ......... C10J 3/20; C10J 3/26; C10J 3/34; C10J 3/487; C10J 3/506; C10J 3/64; C10J 3/66; C10J 3/72; C10J 3/721; C10J 3/723; C10J 3/84
See application file for complete search history.

(56) References Cited

U.S. PATENT DOCUMENTS

| | | | | |
|---|---|---|---|---|
| 5,536,488 | A * | 7/1996 | Mansour | B01B 1/005 423/652 |
| 5,667,556 | A * | 9/1997 | Orth | C22B 5/14 75/450 |
| 5,976,484 | A * | 11/1999 | Teng | C01B 32/324 423/449.7 |
| 6,453,830 | B1 * | 9/2002 | Zauderer | B01D 53/56 110/210 |
| 2002/0095866 | A1 | 7/2002 | Hassett | |
| 2008/0147241 | A1 * | 6/2008 | Tsangaris | C03B 5/005 700/273 |
| 2008/0202028 | A1 * | 8/2008 | Tsangaris | C10J 3/005 48/73 |
| 2008/0222956 | A1 * | 9/2008 | Tsangaris | C10J 3/005 48/77 |
| 2008/0307703 | A1 * | 12/2008 | Dietenberger | C10J 3/463 48/76 |
| 2009/0119990 | A1 * | 5/2009 | Johnson | C10B 1/10 48/61 |
| 2012/0055089 | A1 * | 3/2012 | Kavanaugh | C10J 3/721 48/89 |
| 2013/0257059 | A1 * | 10/2013 | Mason | F02C 7/20 290/1 A |
| 2013/0280792 | A1 * | 10/2013 | Chernov | B09B 3/005 435/257.1 |
| 2016/0230104 | A1 * | 8/2016 | Cheiky | C10J 3/30 |

FOREIGN PATENT DOCUMENTS

| | | |
|---|---|---|
| CN | 203269882 U | 11/2013 |
| CN | 103773506 A | 5/2014 |
| CN | 105647591 A | 6/2016 |
| CN | 106867585 A | 6/2017 |

* cited by examiner

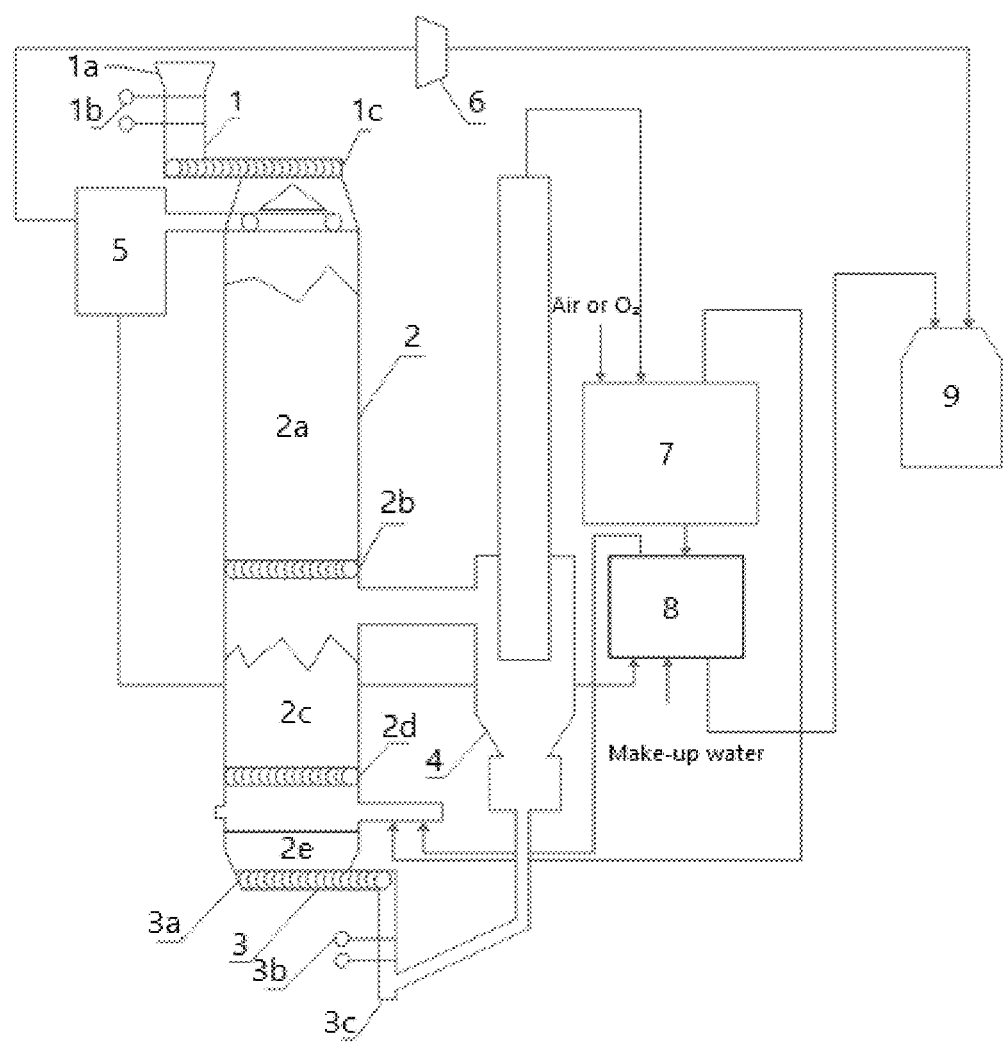

APPARATUS AND A METHOD FOR SOLID FUEL GASIFICATION WITH TAR SELF-REMOVED WITHIN THE GASIFIER

TECHNICAL FIELD

The present invention relates to an apparatus and a method for solid fuel gasification with tar self-removed within the gasifier.

BACKGROUND

Coal accounts for about 70 percent of world energy reserves, while oil and natural gas together account for about 12 percent. Thus, the research and development of coal utilization technology is one of the important parts of energy strategy. However, with the emergence and development of petrochemical industry, the proportion of coal in chemical raw materials has been declining and gradually replaced by oil and natural gas. Until the late 1970s, the development of a global petrochemical industry was affected by the soaring oil price. Meanwhile remarkable progress was made in coal gasification and coal liquefaction of coal chemical industry. Especially after the 1990s, world oil prices remained at a high level for a long time and showed a rising trend, which further promoted the development of coal chemical technology and people again attach importance to coal chemical industry. Chinese nonrenewable resources reserves are characterized by being rich in coal, poor in oil and short in gas, and as an essential part of Chinese energy resources, low-rank coal like lignite and long flame coal account for more than 30 percent of Chinese coal reserves, thus the gasification of low-rank coal is a key research field for China.

The structural characteristics of coal determine the high volatile component and strong activity of low-rank coal. Because of the high proportion of moisture and oxygen and low heat value, direct utilization like combustion or gasification has low efficiency and the economic value is far less than high-rank coal. Thus, it is essential to process the low rank coal to improve its quality before the large-scale development and utilization. One of the most scientific and commonly used methods is pyrolysis, namely, "dry distillation" or thermal decomposition. Pyrolysis refers to a series of physical changes and chemical reactions that occur in coal when it is continuously heated to a higher temperature in the absence of air or in inert gases. In this process, the fracture of cross link bond, recombination of products and the secondary reaction will occur, gas(coal gas), liquid(tar), solid (semicoke) generate eventually. Pyrolysis is an efficient comprehensive resource utilization method that achieves the cascade conversion of different components in coal. It has the advantage of reducing the environmental pollution caused by coal combustion and increasing the comprehensive utilization value of low-rank coal, which can create significant economic and social benefits. However, due to the characteristics of low-rank coal, a large amount of gaseous tar, most of the volatile component and moisture generated in pyrolysis will enter the gasification gas together. Excessive tar easily causes precipitation and clogs the pipe. Using purified gasification gas need a lot of water for washing and cooling, resulting in a large amount of wastewater, which is difficult and expensive to treat, and direct emissions will cause serious pollution to environment. Similar problems also exist in the field of biomass gasification.

Therefore, how to provide a solid fuel gasification apparatus that can not only accomplish effective removal of tar and zero discharge of coking wastewater, but also optimize gas quality during the process, improve energy efficiency and reduce operating cost becomes an industry-wide problem in need of solution.

CONTENTS OF THE INVENTION

Directing at the disadvantages of the existing technologies, the present invention aims to provide a solid fuel gasification apparatus and a method for solid fuel gasification with tar self-removed within the gasifier, which can not only accomplish effective removal of tar and zero discharge of coking wastewater, but also optimize gas quality during the process, improve energy efficiency and reduce operating cost.

The Technical Scheme of the Present Invention

An apparatus for solid fuel gasification with tar self-removed within the gasifier, consisting essentially of a feeder 1, a gasifier 2, a cyclone separator for gasification gas flying ash or fly ash filter separator 4, a condenser 5, a condensate evaporator 8, a preheating device for gasification medium 7, a slag extractor 3 and a gas holder 9.

The feeder 1 consists of a feeding inlet 1a, double sealed feeding valves 1b and a screw feeder 1c. The outlet of the feeding inlet 1a connects with the inlet of the double sealed feeding valves 1b, and at the outlet of the double sealed feeding valves 1b there is a screw feeder 1c which connects to the top of the furnace.

The gasifier 2 consists of a pyrolysis and drying zone 2a, screw dropping devices including a first screw dropping device 2b and a second screw dropping device 2d, a gasification and combustion zone 2c, an ash and slag zone 2e. From top to bottom within the gasifier are in order the pyrolysis and drying zone 2a, the gasification and combustion zone 2c and the ash and slag zone 2e. Between the pyrolysis and drying zone 2a and gasification and combustion zone 2c there is a first screw dropping device 2b. Between the gasification and combustion zone 2c and the ash and slag zone 2e there is a second screw dropping device 2d. Between the gasification and combustion zone 2c and the ash and slag zone 2e there is a gasification agent inlet that is below the second screw dropping device 2d. The pyrolysis and drying zone 2a consists of a drying zone and a pyrolysis zone, and the drying zone is above the pyrolysis zone.

The slag extractor 3 consists of a screw discharger 3a, double sealed discharge valves 3b and a slag discharger 3c. The bottom of the ash and slag zone 2e of the gasifier 2 connects with the inlet of the screw discharger 3a, and the outlet of the screw discharger 3a connects with the slag discharger 3c. Between the screw discharger 3a and the slag discharger 3c there are double sealed discharge valves 3b. The gasification gas outlet of the gasifier 2 connects with the inlet of the cyclone separator for gasification gas fly ash or fly ash filter separator 4. The bottom of the cyclone separator for gasification gas fly ash or fly ash filter separator connects with the inlet of the fly ash collecting pipe. The outlet of the fly ash collecting pipe connects with the slag discharger 3c of the slag extractor 3. At the top of the cyclone separator for gasification gas fly ash or fly ash filter separator there is a gasification gas outlet. The gasification gas outlet connects with the gasification gas inlet of the preheating device for gasification medium 7. The gasification gas outlet of the preheating device for gasification medium 7 connects with the gasification gas inlet of the condensate evaporator 8. The preheating device for gasification medium 7 has an air and oxygen inlet. The preheated air or oxygen outlet of the preheating device for gasification medium 7 connects with gasification agent inlet of the gasifier 2, and the gasification gas outlet of condensate evaporator 8 connects with the gas holder 9.

The gasification gas outlet at the top of the pyrolysis and drying zone 2a connects with the gasification gas inlet of the condenser 5. The gasification gas outlet of the condenser 5 connects with the suction pump 6 inlet. The suction pump 6 outlet connects with the gas holder 9. The condensate outlet of the condenser 5 connects with the condensate inlet of the condensate evaporator 8. The condensate evaporator 8 has a make-up water inlet. A steam outlet of the condensate evaporator 8 connects with the gasification agent inlet of the gasifier 2.

Each screw dropping device is made up of a group of screws, and the spacing of contiguous screws is 1.2 times less than a screw pitch with reverse moving directions.

Among the pyrolysis and drying zone, gasification and combustion zone and tail ash zone within the gasifier 2 there are multilayer screw dropping devices, and each screw dropping device has a porous support baffle.

A method for solid fuel gasification with tar self-removed within the gasifier is a method of absorbing the tar within the apparatus first and combusting it later to supply heat for the gasification process, procedures are as follow:

(1) Feed the solid fuel into the double sealed feeding valves 1b from the feeding inlet 1a to isolate the solid fuel from air, and then into the pyrolysis and drying zone 2a in the upper part of the gasifier 2. After being dried and torrefied, the solid fuel moves downward in the gasifier 2 and enters the pyrolysis zone. The semicoke generated in the pyrolysis process enters the gasification and combustion zone 2c through the first screw dropping device 2b. The hot ash generated in the process of gasification reaction enters the tail ash zone 2e through the second screw dropping device (2d). Finally, the cooling ash is discharged out of the system through the screw discharger 3a.

(2) One part of the gasification gas generated in the gasification and combustion zone 2c moves upward and enters the pyrolysis and drying zone 2a, providing necessary heat for pyrolysis reaction and drying of the materials. It then enters the drying zone after mixing with the gaseous products like pyrolysis gas, tar, steam, and so forth produced in the process of pyrolysis and drying. The pyrolysis gaseous products are cooled when moving upward through the pyrolysis and drying zone 2a. Most tar is absorbed by the cold materials in the cooling process and then enters the pyrolysis zone for pyrolysis again with the materials. The condensed tar absorbed by the cold materials forms gaseous tar and moves up again when being exposed to high temperature in the pyrolysis zone. The above said process repeats, during which the gaseous tar participates in subsequent reactions in the form of solid coke. The already cooled pyrolysis gas and steam in the drying zone are discharged into the condenser from the reactor 5. The gasification gas condensates with steam and a small amount of light tar removed and are then sent into the gas holder 9 by the suction pump 6 for storage. The removed condensate and a small amount of light tar are sent into the condensate evaporator 8.

(3) The other part of the gasification gas generated in the gasification and combustion zone 2c enters the cyclone separator for gasification gas fly ash or fly ash filter separator 4 to remove fine ash, after which it enters the preheating device for gasification medium 7 from the gasification gas outlet at the top of the cyclone separator for gasification gas fly ash or fly ash filter separator 4. Then it enters the condensate evaporator after exchanging heat with the gasification agent oxygen (air). The preheated oxygen (air) is sent into the gasifier 2 from the gasification agent inlet of the gasifier 2 to participate in the gasification reaction. The gasification gas that enters the condensate evaporator 8 continues to provide heat for the evaporation of condensate, make-up water and a small amount of light tar, and is then sent into the gas holder for storage after being cooled.

(4) After being sent into the condensate evaporator 8, the condensate and a small amount of light tar within the condenser 5 evaporate together with the make-up water and are then sent into the gasifier 2 from the gasification agent inlet of the gasifier 2 to participate in the gasification reaction as gasification agent.

The Benefits of the Present Invention

1. The temperature difference between the drying zone and the pyrolysis zone causes the tar to convert repeatedly between gaseous and liquid states, which increases the time of the tar in the gasifier and allows the tar to constantly concentrate and polymerize then become solid coke and continue to participate in the subsequent reactions during the process. This not only avoids the blockage of gasification gas pipeline by the tar, but also eliminates the subsequent washing and cleaning process, which saves the cost and greatly improves the energy efficiency.

2. The condensate evaporator, pyrolysis gas, steam and other gaseous products generated from the gasification gas in the pyrolysis and drying zone move through the condenser and finally return into the gasifier from the gasification agent inlet that is between the tail ash collection zone and gasification zone and continue to participate in the gasification reaction. This achieves zero discharge of wastewater and waste gas, and meanwhile improves the calorific value of gasification gas, the thermal efficiency of gasifier and the quality of released gasification gas in the process.

3. The gasifier's structure is simple and compact, easy to install. Compared with circulating fluidized bed, double bedgasifier and other gasifiers, it has a wide application scope, also applicable for small and medium industrial fields.

DESCRIPTION OF THE DRAWINGS

The sole FIGURE is the structural diagram of the gasifier of the present invention.

As drawings shown: 1 feeder; 1a feeding inlet; 1b double sealed feeding valves; 1c screw feeder; 2 gasifier; 2a pyrolysis and drying zone; 2b first screw dropping device; 2c gasification and combustion zone; 2d second screw dropping device; 2e tail ash zone; 3 slag extractor; 3a screw discharger; 3b double sealed discharge valves; 3c slag discharger; 4 cyclone separator for gasification gas fly ash or fly ash filter separator; 5 condenser; 6 suction pump; 7 preheating device for gasification medium; 8 condensate evaporator; 9 gas holder.

DETAILED DESCRIPTION OF THE INVENTION

Hereinafter, detailed description of the invention will be further described in combination with the drawings and technical scheme.

Embodiments

An apparatus and a method for solid fuel gasification with tar self-removed within the gasifier, consisting essentially of a feeder 1, a gasifier 2, a cyclone separator for gasification gas flying ash or fly ash filter separator 4, a condenser 5, a condensate evaporator 7, a preheating device for gasification medium 8, a slag extractor 3 and a gas holder 9. The feeder 1 consists of a feeding inlet 1a, double sealed feeding valves 1b and a screw feeder 1c. The outlet of the feeding inlet 1a connects with the inlet of the double sealed feeding valves 1c, and at the outlet of the double sealed feeding valves 1c there is a screw feeder 1c which connects to the top of the furnace. The gasifier 2 consists of a pyrolysis and drying zone 2a, screw dropping devices including a first screw dropping device 2b and a second screw dropping device 2d, a gasification and combustion zone 2c, an ash and slag zone 2e. Between the gasification and combustion zone 2c and the ash and slag zone 2e there is a gasification agent inlet. The slag extractor 3 consists of a screw discharger 3a, double sealed discharge valves 3b and a slag discharger 3c. The bottom of the ash and slag zone 2e connects with the inlet of the screw discharger 3a, and the outlet of the screw discharger 3a connects with the slag discharger 3c.

The gasification gas outlet of the gasifier 2 connects with the inlet of the cyclone separator for gasification gas fly ash or fly ash filter separator 4. The bottom of the cyclone separator for gasification gas fly ash or fly ash filter separator 4 connects with the inlet of the fly ash collecting pipe. The outlet of the fly ash collecting pipe connects with the slag discharger 3c. At the top of the cyclone separator for gasification gas fly ash or fly ash filter separator 4 there is a gasification gas outlet. The gasification gas outlet connects with the gasification gas inlet of the preheating device for gasification medium 7. The gasification gas outlet of the preheating device for gasification medium 7 connects with the gasification gas inlet of the condensate evaporator 8. The preheating device for gasification medium 7 has an air and oxygen inlet. The preheated air or oxygen outlet of the preheating device for gasification medium 7 connects with the gasification agent inlet of the gasifier 2, and the gasification gas outlet of the condensate evaporator 8 connects with the gas holder 9. The gasification gas outlet at the top of the pyrolysis and drying zone 2a connects with the gasification gas inlet of the condenser 5. The gasification gas outlet of the condenser 5 connects with the suction pump 6 inlet. The suction pump 6 outlet connects with the gas holder 9. The condensate outlet of the condenser 5 connects with the condensate inlet of the condensate evaporator 8. The condensate evaporator 8 has a make-up water inlet. A steam outlet of the condensate evaporator 8 connects with the gasification agent inlet of the gasifier.

Among the pyrolysis and drying zone 2a, the gasification and combustion zone 2c and the tail ash zone 2e within the gasifier has multilayer screw dropping devices 2b2d and porous support baffles.

A method for solid fuel gasification with tar self-removed within the gasifier is a method of absorbing the tar within the gasifier first and combusting it later to supply heat for the gasification process, procedures are as follow:

(1) Feed the solid fuel into the double sealed feeding valves from the feeding inlet to isolate the solid fuel from air, and then into the pyrolysis and drying zone in the upper part of the gasifier. After being dried and torrefied, the solid fuel moves downward in the gasifier and enters the pyrolysis zone. The semicoke generated in the pyrolysis process enters the gasification and combustion zone through the screw dropping device. The hot ash generated in the process of gasification reaction enters the tail ash zone through the screw dropping device. Finally, the cooling ash is discharged out of the system through the screw discharger.

(2) One part of the gasification gas generated in the gasification and combustion zone moves upward and enters the pyrolysis and drying zone, providing necessary heat for pyrolysis reaction and drying of the materials. It then enters the drying zone after mixing with the gaseous products like pyrolysis gas, tar, steam, and so forth produced in the process of pyrolysis and drying. The pyrolysis gaseous products are cooled when moving upward through the drying zone. Most tar is absorbed by the cold materials in the cooling process and then enters the pyrolysis zone for pyrolysis again with the materials. The condensed tar absorbed by the cold materials forms gaseous tar and moves up again when being exposed to high temperature in the pyrolysis zone. The above said process repeats, during which the gaseous tar participates in subsequent reactions in the form of solid coke. The already cooled pyrolysis gas and steam in the drying zone are discharged into the condenser from the reactor. The gasification gas condensates with steam and a small amount of light tar removed, and are then sent into the gas holder by the suction pump for storage. The removed condensate and a small amount of light tar are sent into the condensate evaporator.

The other part of the gasification gas generated in the gasification and combustion zone enters the cyclone separator for gasification gas fly ash or fly ash filter separator to remove fine ash, after which it enters the preheating device for gasification medium from the gasification gas outlet at the top of the cyclone separator for gasification gas fly ash or fly ash filter separator. Then it enters the condensate evaporator after exchanging heat with the gasification agent oxygen or air. The preheated oxygen (air) is sent into the gasifier from the gasification agent inlet of the gasifier to participate in the gasification reaction. The gasification gas that enters the condensate evaporator continues to provide heat for the evaporation of condensate, make-up water and a small amount of light tar, and is then sent into the gas holder for storage after being cooled.

After being sent into the condensate evaporator, the condensate and a small amount of light tar within the condenser evaporate together with the make-up water and are then sent into the gasifier from the gasification agent inlet of the gasifier to participate in the gasification reaction as gasification agent.

I claim:

1. An apparatus for solid fuel gasification with tar self-removed within the gasifier wherein the apparatus consists essentially of a feeder, a gasifier, a cyclone separator for gasification gas fly ash or fly ash filter separator, a condenser, a condensate evaporator, a preheating device for gasification medium, a slag extractor and a gas holder;

the feeder consists of a feeding inlet, double sealed feeding valves and a screw feeder; an outlet of the feeding inlet connects with an inlet of the double sealed feeding valves, and at an outlet of the double sealed feeding valves there is a screw feeder which connects to a top of a furnace;

the gasifier consists of a pyrolysis and drying zone, screw dropping devices including an first screw dropping device and a second screw dropping device, a gasification and combustion zone, an ash and slag zone; from top to bottom within the gasifier are in order the pyrolysis and drying zone, the gasification and combustion zone and the ash and slag zone; between the pyrolysis and drying zone and gasification and combustion zone there is the first screw dropping device; between the gasification and combustion zone and the ash and slag zone there is the second screw dropping device; between the gasification and combustion zone and the ash and slag zone there is a gasification agent inlet which is below the second screw dropping device; the pyrolysis and drying zone consists of a drying zone and a pyrolysis zone, and the drying zone is above the pyrolysis zone;

the slag extractor consists of a screw discharger, double sealed discharge valves and a slag discharger; a bottom of the ash and slag zone of the gasifier connects with an inlet of the screw discharger, and an outlet of the screw discharger connects with the slag discharger; between the screw discharger and the slag discharger there are the double sealed discharge valves;

a gasification gas outlet of the gasifier connects with an inlet of the cyclone separator for gasification gas fly ash or fly ash filter separator; a bottom of the cyclone separator for gasification gas fly ash or fly ash filter separator connects with an inlet of a fly ash collecting pipe; an outlet of the fly ash collecting pipe connects with the slag discharger of the slag extractor; at a top of the cyclone separator for gasification gas fly ash or fly ash filter separator there is the gasification gas outlet; the gasification gas outlet connects with a gasification gas inlet of the preheating device for gasification medium; The gasification gas outlet of the preheating device for gasification medium connects with the gasification gas inlet of a condensate evaporator; the preheating device for gasification medium has an air and oxygen inlet; a preheated air or oxygen outlet of the preheating device for gasification medium connects with the gasification agent inlet of the gasifier, and a gasification gas outlet of the condensate evaporator connects with a gas holder;

a gasification gas outlet at the top of the pyrolysis and drying zone connects with a gasification gas inlet of the condenser; a gasification gas outlet of the condenser connects with a suction pump inlet; a suction pump outlet connects with the gas holder; a condensate outlet of the condenser connects with a condensate inlet of the condensate evaporator; the condensate evaporator has a make-up water inlet; a steam outlet of the condensate evaporator connects with the gasification agent inlet of the gasifier.

2. An apparatus for solid fuel gasification with tar self-removed within the gasifier as claimed in claim 1 wherein each screw dropping device is made up of a group of screws, and the spacing of contiguous screws is 1.2 times less than a screw pitch with reverse moving directions.

3. An apparatus for solid fuel gasification with tar self-removed within the gasifier as claimed in claim 1 wherein each screw dropping device within the gasifier has a porous support baffle.

4. A method for solid fuel gasification with tar self-removed within the gasifier by absorbing the tar within the gasifier first and combusting it later to supply heat for a gasification process, comprising:

feeding a solid fuel into double sealed feeding valves from a feeding inlet to isolate the solid fuel from air, and then into a pyrolysis and drying zone in an upper part of the gasifier; after being dried and torrefied, the solid fuel moves downward in the gasifier and enters a pyrolysis zone; a semicoke generated in the pyrolysis zone enters a gasification and combustion zone through a first screw dropping device; an ash generated in the gasifier enters a tail ash zone through a second screw dropping device; finally, the ash is discharged out of the gasifier through a screw discharger;

a first part of a gasification gas generated in the gasification and combustion zone moves upward and enters the pyrolysis and drying zone, providing necessary heat for pyrolysis reaction and drying of materials including entering the drying zone after mixing with gaseous products produced in the pyrolysis and drying zone; gaseous products are cooled when moving upward through the pyrolysis and drying zone; tar is absorbed by the materials in the cooling and then enters the pyrolysis zone for pyrolysis again with the materials; condensed tar absorbed by the materials forms gaseous tar and moves up again when exposed to high temperature in the pyrolysis zone; the process repeats, during which the gaseous tar participates in subsequent reactions in a form of solid coke; the cooled gaseous products in the drying zone is discharged into a condenser from a reactor; the gaseous products condense with steam and a small amount of light tar removed, and are then sent into a gas holder by a suction pump for storage; the removed condensate and a small amount of light tar are sent into a condensate evaporator;

a second part of the gasification gas generated in the gasification and combustion zone enters a cyclone separator for gasification gas fly ash or fly ash filter separator to remove fine ash, and then enters a preheating device for gasification medium from a gasification gas outlet at a top of the cyclone separator for gasification gas fly ash or fly ash filter separator; and enters the condensate evaporator after exchanging heat with a gasification agent; the preheated gasification agent is sent into the gasifier from a gasification agent inlet of the gasifier to participate in the gasification process; a gasification gas that enters the condensate evaporator continues to provide heat for the evaporation of condensate, make-up water and a small amount of light tar, and is then sent into the gas holder for storage after being cooled;

after being sent into the condensate evaporator, the condensate and a small amount of light tar within the condenser evaporate together with the make-up water and are then sent into the gasifier from the gasification agent inlet of the gasifier to participate in the gasification process as a gasification agent.

* * * * *